A. TIFT.
FENDER.
APPLICATION FILED AUG. 8, 1911.
1,033,750.
Patented July 23, 1912.
2 SHEETS—SHEET 1.
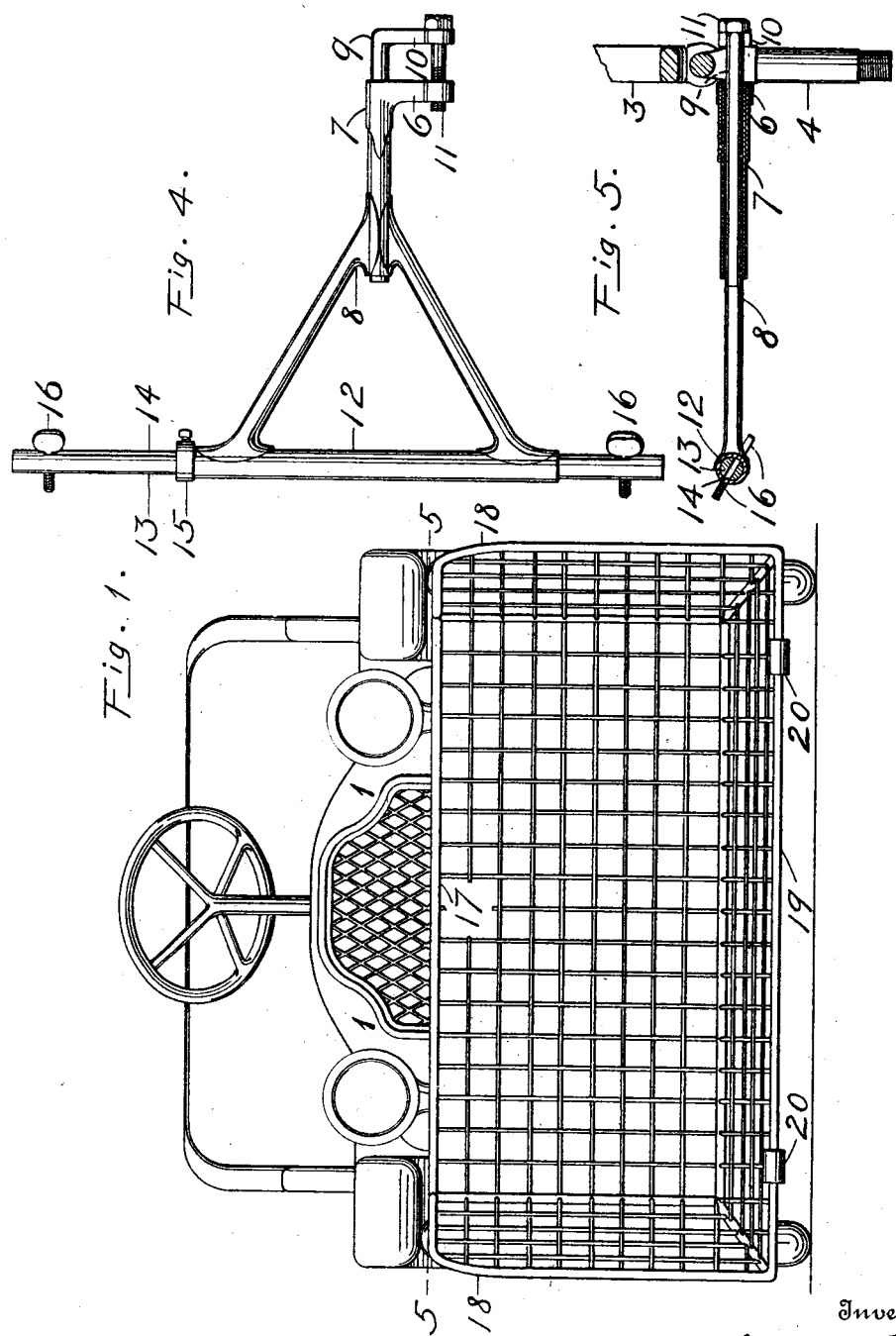
Witnesses
Chas G. Lynch
H. H. Parsons
Inventor
Albertus Tift
By Henry Ellis Chandlee
Attorney

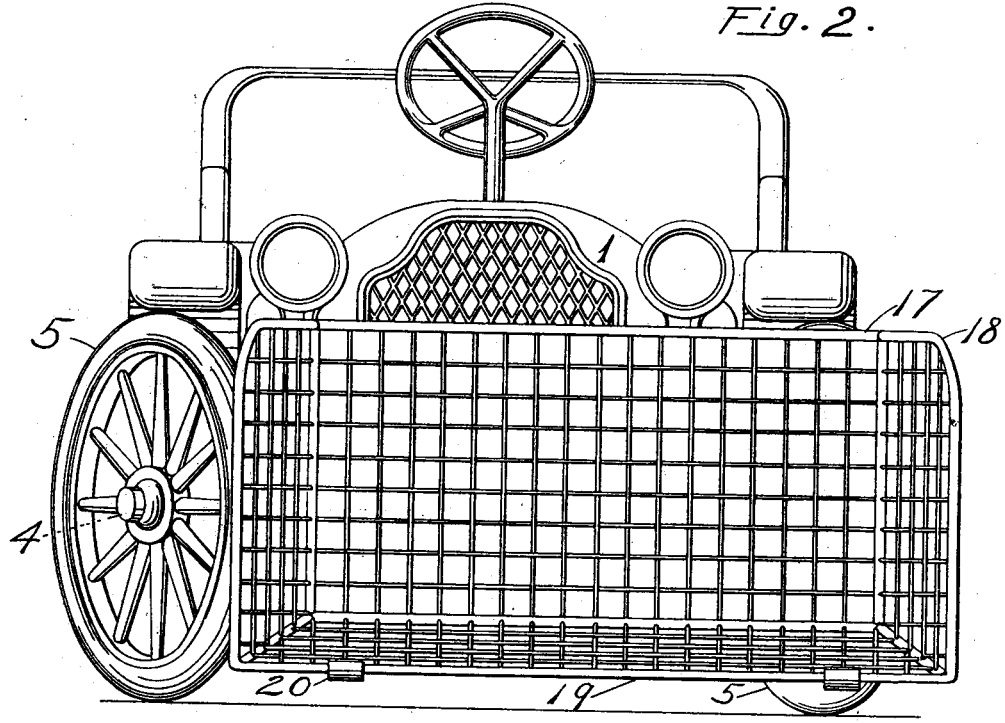
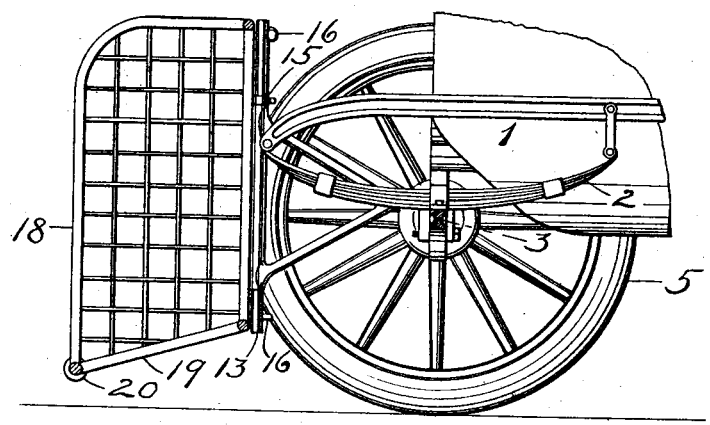

UNITED STATES PATENT OFFICE.

ALBERTUS TIFT, OF DEER HARBOR, WASHINGTON.

FENDER.

1,033,750.   Specification of Letters Patent.   Patented July 23, 1912.

Application filed August 8, 1911. Serial No. 642,908.

*To all whom it may concern:*

Be it known that I, ALBERTUS TIFT, a citizen of the United States, residing at Deer Harbor, in the county of San Juan and State of Washington, have invented certain new and useful Improvements in Fenders, of which the following is a specification.

My invention relates to improvements in fenders and has for its leading object the provision of an improved fender which may be readily attached to an ordinary automobile and which will absolutely prevent accidents due to knocking down and running over of pedestrians.

The further object of my invention is the provision of an improved type of automobile fender for attachment to the stub axles of the automobile which will be at all times disposed before the front wheels of the machine either when the same is following a straight course or when turning and which will consequently prevent the machine from running over an animal or person.

Other objects and advantages of my improved fender will be readily apparent by reference to the following description taken in connection with the accompanying drawings, and it will be understood that I may make any modifications in the specific structure shown and described within the scope of my claims without departing from or exceeding the spirit of the invention.

Figure 1 represents a front view of an automobile equipped with my improved fender. Fig. 2 represents a similar view showing the wheels turned to round a corner. Fig. 3 represents a fragmentary side elevation of the invention as illustrated in Fig. 1. Fig. 4 represents an enlarged detailed view of one of the clamp members and supporting standards carried thereby, and Fig. 5 represents a sectional view of the same.

In the drawings, the numeral 1 designates the body of an automobile having the depending springs 2 to the under face of which is secured the front axle beam 3 having pivoted thereto the stub axles 4 for the front wheels 5 of the automobile.

Bearing against the front of each of the stub axles 4 is the clamp arm 6 of my invention which depends from the tubular portion 7 of the bracket 8, while slidably engaged within said tubular portion 7 is the clamp arm 9 having the depending arm 10. Said arm 9 is adapted to rest on top of the stub axle 4 while the end 10 bears against the rear of the stub axle, a clamping or securing bolt 11 passing through the clamps 6 and 10 to force the same toward each other into tight gripping engagement with the stub axle to prevent liability of slipping of my device upon the axle.

The flaring arms of the bracket portion 8 have secured to their forward ends the vertically disposed sleeve member 12 in which is rotatably engaged a standard 13 having a slot 14 extending longitudinally of the greater portion of the length thereof, said standard being supported with its lower end a suitable distance above the ground by the collar 15 secured thereon and resting against the end of the sleeve 12 to permit of rotation of the standard while preventing vertical movement thereof.

Passing through the slots 14 of the standards 13 of my invention are the set screws 16 engaging the frame work 17 of my fender, said frame work having the laterally extending wings 18 projecting in front of the wheels 5 and having the forwardly extending base portion 19 bearing the rollers 20 adapted to engage the ground when a weight rests on the portion 19 to aid in supporting said weight, said rollers also serving to guide the front end of the fender upward when the car strikes a sudden rise in the ground or road over which it is passing.

From the foregoing description taken in connection with the accompanying drawings, the construction of my improved automobile fender will be readily apparent and it will be seen that on account of the brackets being clamped to the pivoted stub axles that the brackets will at all times project forward parallel to the front wheels irrespective of the turning of said wheels and consequently the fender will at all times be held in front of the wheels, which is especially desirable when turning corners where it is impossible to see but a very short distance ahead of the automobile and which is when a large number of accidents due to machines striking pedestrians occur. This swinging of the fender with the wheels is permitted by the rotative engagement of the standards 13 in the sleeves 12 of the brackets.

I claim:

1. The combination with the steering gear of an automobile, of brackets clamped thereto, longitudinally slotted standards rotatably secured to the brackets, and a fender secured to the standards and projecting laterally beyond the wheel line, and means passing through the slots of the standards to hold said fender in an adjusted position thereon.

2. The combination with the steering gear of an automobile, of brackets having tubular portions, clamping arms slidable therein to clamp said brackets to said gear, vertically disposed sleeves carried by the brackets, longitudinally slotted standards rotatably supported by the sleeves, and clamp screws passing through the slots of the standards and engaging the fender for securing the same in adjusted positions on the standards.

3. The combination with the steering gear of an automobile, of brackets clamped thereto, longitudinally slotted standards rotatably supported by the brackets, a fender, and clamp screws passing through the slots of the standards and engaging the fender for securing the fender in adjusted position on the standards.

In testimony whereof I affix my signature, in the presence of two witnesses.

ALBERTUS TIFT.

Witnesses:
R. E. Morris,
M. C. Hawley.

---

Copies of this patent may be obtained for five cents each, by addressing the "Commissioner of Patents, Washington, D. C."